(12) United States Patent
Schmidt et al.

(10) Patent No.: US 11,638,058 B2
(45) Date of Patent: Apr. 25, 2023

(54) MEDIA CHANNEL IDENTIFICATION AND ACTION, WITH DISAMBIGUATION THROUGH CLIENT-SIDE FINGERPRINT MATCHING OF CHANNEL-SPECIFIC ICON

(71) Applicant: Roku, Inc., San Jose, CA (US)

(72) Inventors: Andreas Schmidt, San Pablo, CA (US); Shashank Merchant, Emeryville, CA (US); Markus Kurt Peter Cremer, Emeryville, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/644,658

(22) Filed: Dec. 16, 2021

(65) Prior Publication Data

US 2022/0191569 A1 Jun. 16, 2022

Related U.S. Application Data

(60) Provisional application No. 63/126,384, filed on Dec. 16, 2020, provisional application No. 63/126,383, filed on Dec. 16, 2020.

(51) Int. Cl.

| | |
|---|---|
| *H04N 21/234* | (2011.01) |
| *H04N 21/2668* | (2011.01) |
| *H04N 21/431* | (2011.01) |
| *H04N 21/81* | (2011.01) |
| *H04N 21/442* | (2011.01) |
| *H04N 21/654* | (2011.01) |

(52) U.S. Cl.
CPC ... *H04N 21/2668* (2013.01); *H04N 21/23424* (2013.01); *H04N 21/4314* (2013.01); *H04N 21/44204* (2013.01); *H04N 21/654* (2013.01); *H04N 21/8153* (2013.01)

(58) Field of Classification Search
CPC ................................................ H04N 21/23424
See application file for complete search history.

(56) References Cited

U.S. PATENT DOCUMENTS

| | | |
|---|---|---|
| 2016/0295287 A1 | 10/2016 | Jiang et al. |
| 2017/0251250 A1* | 8/2017 | Lee ..................... H04N 21/4756 |
| 2017/0264951 A1* | 9/2017 | Mitra ............... H04N 21/44008 |
| 2021/0385534 A1 | 12/2021 | Baig et al. |
| 2022/0191588 A1 | 6/2022 | Schmidt et al. |

* cited by examiner

*Primary Examiner* — Michael H Hong
(74) *Attorney, Agent, or Firm* — Sterne, Kessler, Goldstein & Fox P.L.L.C.

(57) ABSTRACT

Disclosed is a method including (i) detecting that query fingerprint data representing frames of video content being rendered by a media presentation device matches reference fingerprint data representing frames of multiple channels of video content, including detecting that the query fingerprint data matches multiple instances of reference fingerprint data each representing frames of a different respective channel in the multiple channels of video content, and (ii) responsive to at least the detecting that the query fingerprint data representing the frames of the video content being rendered by the device matches the reference fingerprint data representing the frames of the multiple channels of video content, configuring the device with channel-icon fingerprint data representing channel icons of the multiple channels of video content, to enable the device to perform channel-icon fingerprint matching to determine which channel of the multiple channels is being rendered by the device.

20 Claims, 7 Drawing Sheets

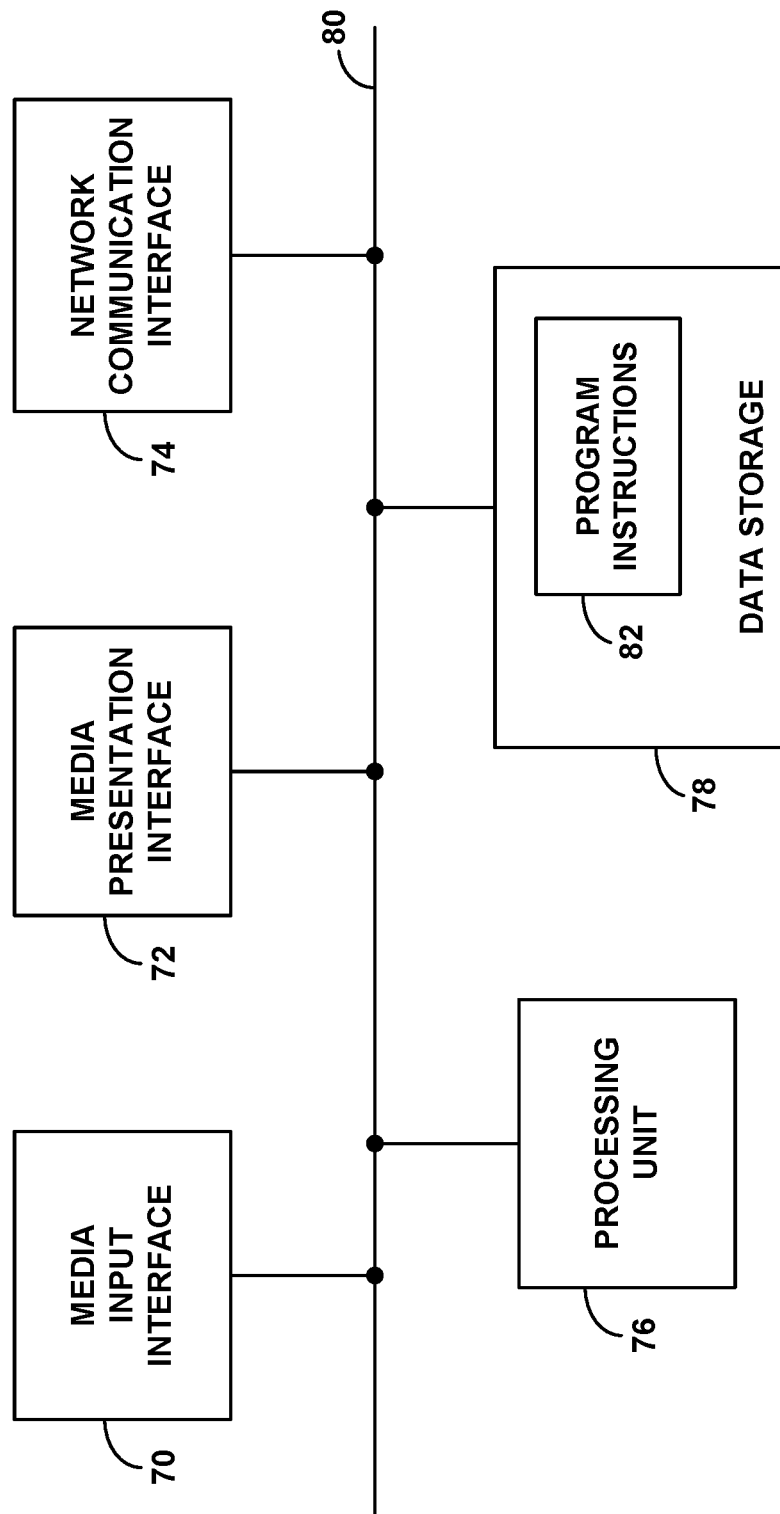

MEDIA CHANNEL IDENTIFICATION AND ACTION, WITH DISAMBIGUATION THROUGH CLIENT-SIDE FINGERPRINT MATCHING OF CHANNEL-SPECIFIC ICON

REFERENCE TO RELATED APPLICATIONS

This application claims priority to U.S. Provisional Patent Application No. 63/126,383, filed Dec. 16, 2020, and to U.S. Provisional Patent Application No. 63/126,384, filed Dec. 16, 2020, each of which is hereby incorporated by reference in its entirety.

BACKGROUND

A typical media presentation device operates to receive an analog or digital media stream representing video content and to render and present the video content on a user interface such as a display screen. Examples of such devices include, without limitation, televisions, computer monitors, and projection systems.

In many cases, such a media presentation device may be in communication with a receiver, such as a local set top box, streaming media receiver, or other similar device or a remote server, that has access to numerous discrete channels of video content and that can selectively deliver a given such channel's video content to the media presentation device for playout.

By way of example, a television may be communicatively linked with a cable-TV set top box that has access to a set of cable-TV channels, and the set top box may be configured to receive user input selecting a particular channel and to responsively tune to the selected channel and output to the television the video content of the selected channel, for presentation of the media content to a user. And as another example, a media presentation device such as a display (e.g., television) may be communicatively linked with a computer or streaming-media receiver that has access to a myriad of online streaming media channels, and the computer or streaming-media receiver may be configured to receive user input selecting a particular channel and to responsively initiate receipt and output of video content of the selected channel to the display for presentation to a user.

SUMMARY

When a media presentation device receives and renders video content, the media presentation device may not have an indication of which channel the media presentation device is receiving, i.e., which channel carries the video content that the media presentation device is receiving and rendering. A receiver or other device that selectively tunes to the channel and receives the video content and that provides the video content to the media presentation device may have such information, but the media presentation device that receives the video content from that other device may not have such information.

For example, if a television is coupled with a cable-TV set top box and a user selects a particular cable channel on the set top box, the set top box may thereby have an indication of the selected channel as the channel on which the set top box is then receiving video content that the set top box is outputting to the television. But the television itself may merely receive and render the video content and may have no indication of the selected channel. Likewise, if a television is coupled with a streaming-media receiver and a user selects a particular streaming-media channel on the receiver, the receiver may thereby have an indication of the selected channel on which the receiver is then receiving video content that the receiver is outputting to the television. But the television itself may likewise merely receive and render the video content and may have no indication of the selected channel.

For various reasons, however, it may be useful to determine which of various channels is the channel that carries the video content being received and/or rendered by a media presentation device. Further, it may be useful to do so without receiving from a channel-selection device (e.g., receiver or remote control) a report of the channel to which that device is tuned, and perhaps without any involvement of the channel-selection device. For instance, it may be useful for the media presentation device itself, and/or a network server working in cooperation with the media presentation device, to determine the channel based on an evaluation of the video content that is being rendered (e.g., being already rendered, currently being rendered, or being in queue to be rendered) by the media presentation device. Given knowledge of the channel on which the video content is arriving, the media presentation device, the network server, and/or another entity could then carry out one or more operations keyed to the channel, such as determining and recording an extent to which content of that channel is being played, selectively replacing a predetermined portion of the video content with alternative video content (such as a replacement advertisement), or superimposing channel-specific content over the video content for presentation along with the video content, among numerous other possibilities.

One method to determine the channel that the media presentation device is receiving and rendering is to have the media presentation device (or perhaps an adjunct device) and/or a network server generate digital fingerprint data representing frames of the video content being received and rendered by the media presentation device, and to then compare that fingerprint data with reference fingerprint data representing frames of various known channels.

For example, a network server or other such entity may establish or otherwise have access to reference data that includes digital reference fingerprint data representing video frames respectively of each of the channels available to provide video content to the media presentation device (e.g., each of the channels within a subscription plan for a set top box that supplies media content to the media presentation device, or each of the channels available to a streaming-media receiver that supplies media content to the media presentation device) and that maps each such instance of reference fingerprint data to the channel on which the video content is provided. As the media presentation device receives and renders video content of a given such channel, the media presentation device may then generate digital query fingerprint data representing video frames of that channel and, through a network communication interface, report the generated query fingerprint data to the network server for analysis. The network server may then compare the reported query fingerprint data with the reference fingerprint data of various channels to find a match with reference fingerprint data of a particular channel and to thereby determine that the channel that the media presentation device is receiving and rendering is the particular channel that the reference data maps with that matching reference fingerprint data. Upon thereby determining the channel that the media presentation device is receiving and rendering, the network server may then communicate an indication of the channel to the media presentation device, and the media presentation device may take channel-specific action. Alternatively, the network server itself or another entity may take channel-specific action based on the determined channel.

Unfortunately, however, a problem that can arise in this process is that the same video content may be provided on multiple different channels, whether concurrently or at different times, and so fingerprint data representing video content being received and rendered by a media presentation device may not correlate with just the channel that the media presentation device is receiving and rendering. For example, a sports game or political event might be broadcast concurrently on multiple different channels, or a syndicated television or radio show might be broadcast on multiple different such channels concurrently or at different times. In these or other scenarios, if the media presentation device is presenting video content of a given such channel and generates and provides query fingerprint data representing frames of that video content, that query fingerprint data may match reference fingerprint data of multiple channels, and consequently the channel-identification would be inconclusive.

As a specific example of this, consider a scenario where two different video content providers both broadcast the same sports game, each on a separate respective channel, and where an advertiser has a contract with just one of the content providers to present a pop-up or replacement advertisement on that provider's broadcast of the game. In this scenario, when a media presentation device is receiving and presenting one of these broadcasts, if the media presentation device generates and provides to the network server query fingerprint data representing video frames of the broadcast being received, the network server may determine that the query fingerprint data matches reference fingerprint data representing video frames of both content providers' broadcasts of the game, and so it would be unclear whether or not the media presentation device should present the pop-up or replacement advertisement.

Disclosed herein are methods and systems to help disambiguate channel identification in a scenario where query fingerprint data representing frames of video content being rendered (e.g., received and rendered) by a media presentation device matches reference fingerprint data representing frames of multiple channels of video content.

In accordance with the disclosure, a network server or other entity carrying out this analysis will detect a multi-match scenario by determining that query fingerprint data representing frames of the video content being rendered by the media presentation device matches reference fingerprint data representing frames of multiple channels of video content. Faced with the detected multi-match scenario, the entity will then work with the media presentation device to facilitate disambiguation by causing the media presentation device to perform a more granular fingerprint analysis focused on a channel-specific icon present on the channel being rendered—so as to determine which of the multiple channels is the channel being rendered by the media presentation device.

In one respect, for instance, disclosed is a method that could be carried out by a computing system, such as by a server in network communication with the media presentation device for instance. As disclosed, the method could include the computing system detecting that query fingerprint data representing frames of video content being rendered by a media presentation device matches reference fingerprint data representing frames of multiple channels of video content, including detecting that the query fingerprint data matches multiple instances of reference fingerprint data each representing frames of a different respective channel in the multiple channels of video content. Further, the method could include, responsive to at least the detecting that the query fingerprint data representing the frames of the video content being rendered by the media presentation device matches the reference fingerprint data representing the frames of the multiple channels of video content, configuring the media presentation device with channel-icon fingerprint data representing channel icons of the multiple channels of video content, to enable the media presentation device to perform channel-icon fingerprint matching to determine which channel of the multiple channels is being rendered by the media presentation device.

In another respect, disclosed is a system including a network communication interface, a processing unit, non-transitory data storage, and program instructions stored in the non-transitory data storage and executable by the processing unit to carry out such operations. Further, in yet another respect, disclosed is non-transitory data storage having stored program instructions executable (e.g., by a processing unit) to carry out such operations.

In still another respect, disclosed is a method that could be carried out by a media presentation device. As disclosed, the method could include the media presentation device generating query fingerprint data representing video frames of a channel being rendered by the media presentation device and transmitting the generated query fingerprint data from the media presentation device over a network to a server. Further, the method could include, in response to transmitting the query fingerprint data to the server, the media presentation device receiving, from the server, channel-icon fingerprint data representing channel icons of multiple channels selected based at least on the server having detected that the query fingerprint data representing the video frames of the channel being rendered by the media presentation device matches the reference fingerprint data representing the frames of the multiple channels of video content. And the method could include, in response to receiving the channel-icon fingerprint data from the server, the media presentation device performing channel-icon fingerprint matching to determine which channel in the multiple channels is the channel being rendered by the media presentation device.

Further, in yet another respect, disclosed is a media presentation device having a media input interface through which to receive video content to be presented by the media presentation device, a media presentation interface for presenting the received video content, and a network communication interface. Such a media presentation device could be configured to carry out operations such as those noted above. And still further, in another respect, disclosed is non-transitory data storage having stored program instructions executable (e.g., by a processing unit) to carry out such operations as well.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

BRIEF DESCRIPTION OF THE DRAWINGS

FIG. 7 is a simplified block diagram of an example media presentation device.

DETAILED DESCRIPTION

Figure 1:
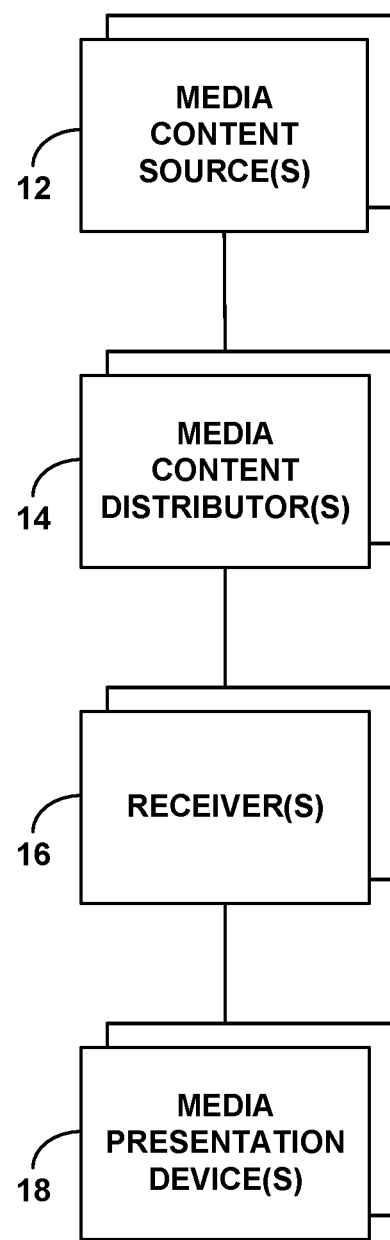
FIG. 1 is a simplified block diagram of an example system in which various disclosed principles can be applied.

Referring to the drawings, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes one or more media content sources 12 (e.g., broadcasters, web servers, etc.), one or more media content distributors 14 (e.g., multi-channel distributors, such as cable providers, satellite providers, over-the-air broadcast providers, web aggregators, etc.), one or more media content receivers 16 (e.g., cable receivers, satellite receivers, over-the-air broadcast receivers, computers or other streaming media receivers, etc.), and one or more clients or media presentation devices 18 (e.g., televisions or other display devices, etc.)

In practice, for instance, the media content sources 12 could be national broadcasters, the media content distributors 14 could be local affiliates and/or other local content distributors in particular designated market areas (DMAs) or streaming-media service providers, and the receivers 16 and media presentation devices 18 could then be situated at customer premises, such as homes or business establishments. With this or other arrangements, the content sources 12 could deliver media content, including video content, to the content distributors 14 for distribution to receivers 16 at customer premises, and the content distributors could distribute the media content to the receivers 16 on discrete channels (e.g., particular frequencies). Each receiver could then respond to user input or one or more other triggers by tuning to or otherwise arranging to receive a selected channel and outputting to a media presentation device 18 the media content, including the video content, that is arriving on the selected channel. And the media presentation device 18 could receive and render the media content (e.g., display the video content).

In this arrangement, as the media presentation device receives and renders this media content, the media presentation device may have no indication of the channel on which the media content is arriving, i.e., of the channel to which the receiver is tuned or that the receiver is otherwise arranged to receive. Rather, the media presentation device may be configured simply to receive the media content as a media stream from the receiver and to render the received media content. Per the present disclosure, however, the media presentation device may be in communication with a network server and may work with the network server to facilitate identification of the channel and thus to facilitate taking useful channel-specific action.

Figure 2:
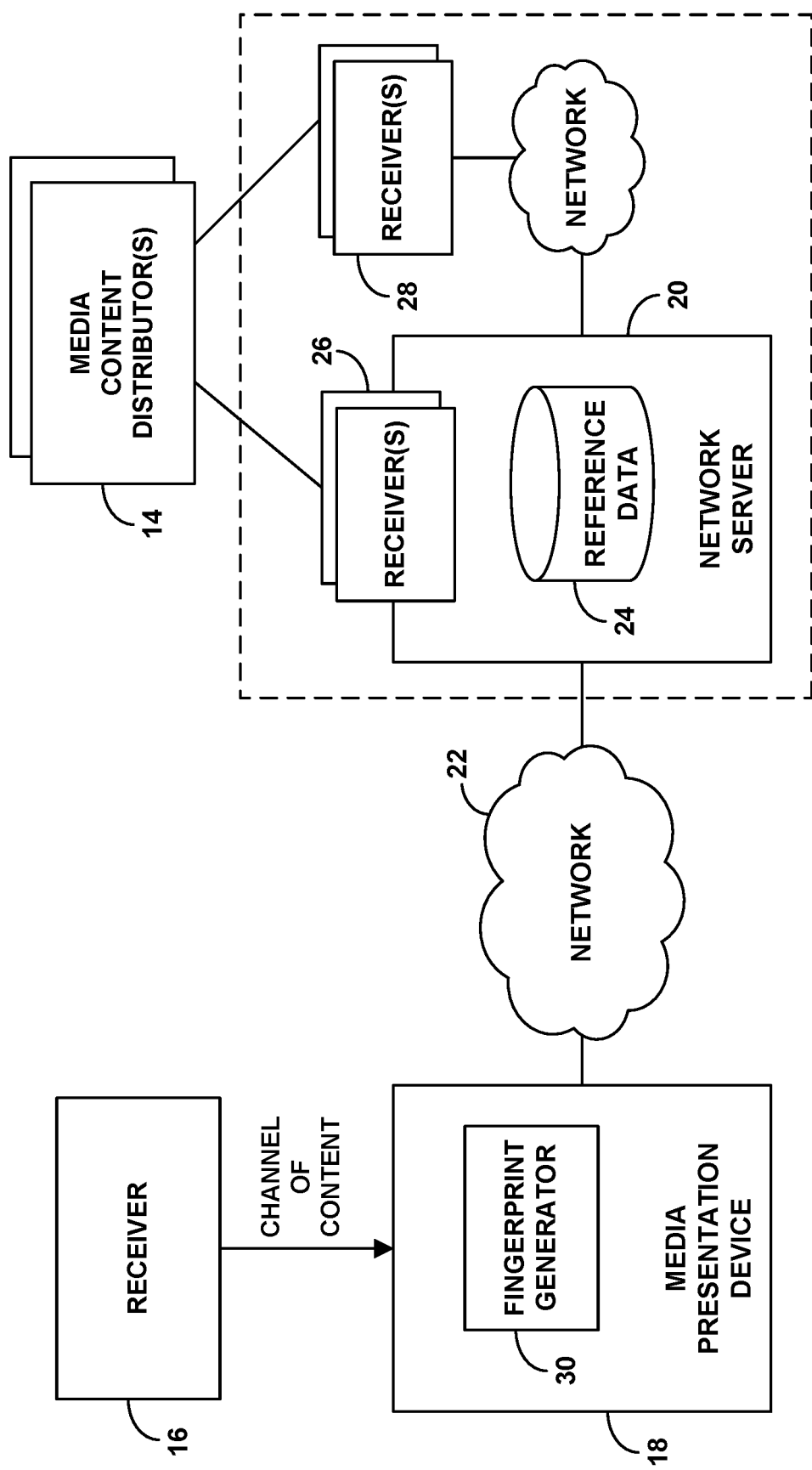
FIG. 2 is a simplified block diagram of an example network arrangement in which a media presentation device communicates with a network server to facilitate implementing various disclosed principles.

FIG. 2 illustrates an example network arrangement in which a media presentation device 18 is in communication with a network server 20 via a network 22, such as the Internet. In practice, the media presentation device 18 may sit as a node on a local area network (LAN) at customer premises, with the media presentation device having an assigned Internet Protocol (IP) address on the LAN and the LAN having an IP address on the Internet. Further, the network server 20 may also be accessible at an IP address on the Internet. With this arrangement, the media presentation device may initiate and engage in IP communication with the network server via the Internet, to report a fingerprint of media content being rendered by the media presentation device, so as to facilitate channel identification and associated action.

As discussed above, the network server 20 or another entity operating in accordance with the present disclosure could establish or have access to reference data 24 for media content that is carried or scheduled to be carried on at least each of various channels accessible to the media presentation device 18. The reference data, which could be stored in a relational database or other form, could include, respectively per channel, reference fingerprint data representing video frames of the channel, perhaps a reference fingerprint stream representing frames of video content most recently carried by the channel (e.g., on a sliding window basis covering a most recent period of time). Alternatively or additionally, the reference data could include respective reference fingerprint data (e.g., reference fingerprint stream) representing video frames of each media content program (e.g., television broadcast, streaming media file, etc.) that is available and/or scheduled to be carried on a particular channel. As such, the reference data could map each instance of reference fingerprint data (e.g., reference fingerprint(s) of one or more video frames) to a channel on which the associated video frames are or may be carried.

In mapping reference fingerprint data to channels, the reference data could characterize the channels by various attributes, to help distinguish the channels from each other. For example, where a receiver or other such device provides multiple different channels selectable by channel number, name, or other identifier, the reference data could characterize the channels by their respective channel numbers, names, or other identifiers. And as another example, where each channel carries a particular content source's content, such as the content of one of a particular broadcaster for instance, the reference data could characterize the channels by their respective content sources' identities. Still further, where more than one content distributor (e.g., multichannel distributor) distributes content sources' content, the reference data could characterize the channels by their respective content distributors' identities. And for channels that are broadcast in particular geographic locations, such as a particular DMAs, the reference data could characterize the channels by their broadcast locations. In practice, the reference data could correlate each reference fingerprint with one or more of these or other attributes.

The network server 20 or other entity operating in accordance with the present disclosure could establish some or all of this reference data by analyzing video content arriving on each of the various channels (e.g., at least the video content arriving on each of various channels that are available to a receiver that serves the media presentation device). To facilitate this, as shown, the server could include or be interconnected with one or more receivers 26 that are configured to receive video content from one or more of the media content distributors 14 on various channels in much the same way that receivers would be configured to receive video content at customer premises. For instance, the server could include or be interconnected with one or more cable-TV set top boxes, computers, streaming-media receivers, or other media receivers, or could be configured to emulate one or more such receivers. The server could then be configured to receive and analyze the respective video content arriving on each channel and to generate, for each channel, reference fingerprint data representing video frames of the channel, using any video fingerprinting process now known or later developed.

Without limitation, an example digital fingerprinting process could apply on a per video frame basis as to each frame as a whole and could involve establishing a representation of luminosity and/or other video characteristics. For instance, for a given video frame, the server could programmatically divide the frame into a grid, and the server could measure luminosity of the frame per grid cell and generate a bit string with each bit or series of bits representing luminosity per grid cell, or representing a weighted difference between the luminosity of certain defined pairs of the grid cells, or the like. Further, the computing system could apply this process on an ongoing basis to generate the reference fingerprint data as a fingerprint stream over time. For instance, the server could apply this process to each frame, to each key frame, periodically, or on another defined basis, with each frame's bit string defining a digital fingerprint and/or with a specified hash, combination or series of such bit strings or other representative values defining a digital fingerprint, on a sliding window basis. Many other digital video fingerprinting processes could be used as well.

In practice, the server could be configured to receive concurrently on multiple such channels (perhaps all of the channels) and to analyze and generate respective reference fingerprint data for the channels in parallel, or the server might be configured to hop from channel to channel, possibly repeatedly cycling through the channels, to analyze and generate a respective reference fingerprint for each channel. Further, the server could continue to do this in real-time, saving respective fingerprint data of at least a most recent time window of video content for each channel, for reference. And the server could record each channel's reference fingerprint data in the reference data in association with a characterization of the channel (e.g., with attributes such as those noted above) and timestamp information indicating a time of receipt of the associated video content. Here, the server would have knowledge of each channel (e.g., channel number, name, or other identifier), just as a receiver would normally have knowledge of the channel to which the receiver is tuned. Further, the server may have access to guide information or other such data specifying attributes of each such channel (e.g., content source identity, content distributor identity, etc.), so that the server can determine and record channel attributes respectively for each instance of reference fingerprint data.

Alternatively or additionally, the server could receive such reference fingerprint data from external media receiver devices 28, such as from media receiver devices located in various respective DMAs. This implementation could be especially useful for channels that are provided only in specific DMAs. In this implementation, each media receiver device 28, perhaps interworking with an associated computer server, could be configured to receive and analyze the respective video content arriving on each channel available to the media receiver device, to generate for each such channel reference fingerprint data (e.g., a reference fingerprint stream) of the channel's video content using any fingerprint process now known or later developed, and to provide the reference fingerprint data (e.g., periodically or continuously) via a network connection to the server 20. Further, the media receiver device 28 could provide server 20 with information characterizing the channel on which the media content represented respectively by each such instance of reference fingerprint data is arriving, such as the channel number and one or more other attributes noted above. And the server could thus record each instance of received reference fingerprint data along with its associated channel attributes.

Still alternatively or additionally, the server could receive or perhaps establish such reference fingerprint data for media content programs that are available or scheduled to be provided on particular channels. For instance, providers or distributors of various media content programs could generate reference fingerprint data for the media content programs (e.g., reference fingerprint streams over the course of respective media content programs), again using any media fingerprinting process now known or later developed, and that reference fingerprint data could be provided to the server. Alternatively, the server could receive advance copies of the media content programs and could itself generate such reference fingerprint data. Further, the server could receive or determine from program guide information the channel on which the media content program is available or scheduled to be provided, and perhaps a day and time at which the media content is scheduled to be provided. The server could then record each media content program's reference fingerprint data in the reference data in association with the channel on which the media content program is available or scheduled to be carried, likewise with associated channel attributes, and perhaps in association with a day and time at which the media content program is scheduled to be provided.

Given this or other such reference data, when the server is presented with query fingerprint data representing video frames of an unknown channel, the server could compare the query fingerprint data with various instances of the stored reference fingerprint data representing video frames of various channels, using any fingerprint comparison process now known or later developed. For instance, the server could compare a bundle of query fingerprints with a corresponding bundle of reference fingerprints per channel. And through this comparison, the server could find that the query fingerprint data matches reference fingerprint data representing video frames of a particular channel and could thereby conclude that that is the channel represented by the query fingerprint data.

To facilitate this comparison, the query fingerprint data would preferably be generated using the same fingerprinting process that is used to generate the various instances of reference fingerprint data, so that portions of the query fingerprint data would correspond with portions of the reference fingerprint data. For instance, the query fingerprint data and reference fingerprint data could be generated on a per-video-frame basis as discussed above, using the same grid and same basis for representing luminosity values and/or other characteristics in the same manner.

To compare the query fingerprint data with an instance of reference fingerprint data, the server could compare corresponding portions of the fingerprints data with each other to determine whether the portions match exactly or within defined tolerances. For example, the server could conduct this analysis on a whole video-frame basis, comparing a query fingerprint of a video frame against a reference fingerprint of a video frame, such as by computing a maximum deviation between the fingerprints and determining if the maximum deviation is within a predefined tolerance. Further, if the fingerprints are binary, this could be a Boolean determination, and if the fingerprints are more complex values, such as decimal values or vectors (e.g., grey values per video frame region), this could involve determining a distance between the values or vectors. Numerous other examples are possible as well.

This fingerprint comparison process could be thus conducted with a desired level of tolerance. For instance, the comparison could be coarse, with relatively high tolerance for differences between the fingerprints, such as with tolerance for a greater number of differences and/or tolerance for a greater size of differences. By way of example, when comparing two 32-bit fingerprints with each other, a coarse comparison may deem the fingerprints to match each other generally even if two or another designated number of bits do not match. Or the comparison could be more granular, with lower tolerance for such differences, and/or with comparisons focused on specific fingerprint components possibly representing specific portions of the underlying media. Further, this comparison could be done on a sliding window basis, by comparing query fingerprints representing a time sequence of video frames with reference fingerprints representing numerous such time sequences of video frames, or vice versa, to account for time shifting.

Thus, if the server is faced with query fingerprint data representing video frames of a channel being rendered by the media presentation device 18, the server could compare the query fingerprint data with the reference fingerprint data in the reference data in an effort to find a match. And if the server thereby finds with sufficient certainty that the query fingerprint data matches reference fingerprint data representing video frames of a particular channel, the server could conclude that that is the channel being rendered by the media presentation device (i.e., that that is the channel carrying the video content being rendered by the media presentation device). In turn, the server could responsively take a channel-specific action based on the identified channel, or cause or enable the media presentation device and/or one or more other entities to take a channel-specific action based on the identified channel.

To facilitate this, the media presentation device 18 or another entity could be configured to generate query fingerprint data representing video frames of the channel being rendered by the media presentation device and to transmit the query fingerprint data to the server 20 for analysis.

For instance, as shown in FIG. 2, the media presentation device could include a fingerprint generator 30, which could be configured to generate digital query fingerprint data representing video frames of the channel rendered by the media presentation device. Such a fingerprint generator could be configured to generate the query fingerprint data as the media presentation device is receiving video frames of the channel from a receiver 16 and/or as the media presentation device is processing the media content for presentation. As such, the fingerprint generator 30 could receive as input a copy of video frames arriving at the media presentation device from the receiver and/or being processed for presentation by the media presentation device, and to generate query fingerprint data representing those video frames, using the same fingerprinting process used to generate the reference fingerprints, likewise as to each of various such video frames as a whole for instance.

In practice, the fingerprint generator could be configured to generate such query fingerprint data as a fingerprint stream on an ongoing basis, such as on a per frame basis (e.g., per key-frame basis) or other basis. And the media presentation device could be configured to transmit the query fingerprint data via network 22 to the server 20 for analysis, perhaps until the server identifies the channel being rendered (and then again if the channel changes). By way of example, the media presentation device could be configured to periodically or from time to time transmit to the server query fingerprint data representing a latest bundle of video frames of the channel rendered by the media presentation device. In particular, the media presentation device could generate a message carrying the latest generated query fingerprint data, along with one or more timestamps and/or other such data as well as an identifier of the media presentation device, and could transmit the message to the server's IP address. And the server could thereby receive the query fingerprint data for analysis.

Alternatively, the media presentation device could transmit to the server, and the server could thus receive, various data regarding video frames of the channel being rendered by the media presentation device, likewise on an ongoing basis or other basis, to enable the server itself or another entity to generate query fingerprint data representing video frames of the channel being rendered by the media presentation device. For example, the media presentation device could transmit to the server individual video frames (e.g., snapshots) of the channel. And the server could generate query fingerprint data representing those video frames for analysis.

Through the process described above, the server could thus compare the query fingerprint data representing video frames of the channel being rendered by the media presentation device with the reference fingerprint data in the reference data. And as noted above, if the server thereby finds matching reference fingerprint data, the server could determine the channel that the reference data maps with the matching reference fingerprint data and could conclude that the determined channel is the channel being rendered by the media presentation device.

In response to thereby determining the channel at issue, the server could then take, or cause to be taken, one or more channel-specific actions based on the determination of the channel. In particular, the server itself could take action based on the channel determination, or the server could signal to another entity, perhaps to the media presentation device, to cause the other entity to take action based on the channel determination.

For example, the server could record the fact that the media presentation device is presenting content of that particular channel, as part of a channel rating or analytics system to measure the extent to which particular channels are being presented by media presentation devices. For instance, the media presentation device could regularly (e.g., periodically) report to the server query fingerprint data representing the content that the media presentation device is rendering, and the server could carry out processes such as those discussed herein to determine the channel being rendered. Each time the server thus determines that a channel is being rendered, the server could add to a count or other statistic of the channel being rendered, as data to indicate the extent to which that channel is being presented. Further, these counts or other statistics could be per media presentation device (as device-specific viewing analytics), indicating the extent to which the media presentation device presents the channel at issue.

As another example, the server could responsively cause the media presentation device to present supplemental content, such as a pop-up advertisement as discussed above, a commercial break, or a channel identification, among other possibilities, possibly as a replacement for one or more portions of the media content. For instance, given knowledge of the channel at issue, the server could generate or select (e.g., from server data storage) particular supplemental media content associated specifically with the determined channel (and perhaps further based on profile data (e.g., device-specific viewing analytics) associated with the particular media presentation device) and could transmit the supplemental media content to the media presentation device for the media presentation device to present in conjunction with the media content that the media presentation device is receiving from the receiver. (Alternatively one or more other servers or systems could be involved with this or other such features.) The media presentation device could thus receive the supplemental media content from the server and present it in conjunction with the media content that the media presentation device is receiving from the receiver. By way of example, based on a contract with an advertiser and/or channel provider or distributor, the server could trigger and enable dynamic ad insertion to replace an ad on the channel being rendered.

In practice, this process could involve the server receiving in real-time from the media presentation device query fingerprint data representing video frames of the channel being rendered by the media presentation device and the server determining that the received query fingerprint data matches reference fingerprint data representing video frames of a known channel that the server or an associated device is concurrently receiving (or has scheduled for the same time).

In some cases, however, there may be a time difference between when the media presentation device renders the video frames and timestamps and transmits the query fingerprint data to the server and when the server or associated device receives the video frames on the known channel and otherwise has the reference fingerprint data timestamped. As noted above, the server could account for this time difference by comparing the received query fingerprint data over a sliding window of the reference fingerprint data or vice versa.

Further, the server could account for this time difference when taking action in response to a determined match between the received query fingerprint data and the reference fingerprint data. For example, if the media presentation device receives the video frames sufficiently earlier than the server's timestamp for the video frames (e.g., more than a few seconds earlier), the server could still identify a fingerprint match and could record analytics data. But in response to detecting that time difference, the server might forgo having the media presentation device present associated supplemental content or take other such action, to help avoid a situation where the media presentation device presents the supplemental content too late (e.g., out of sync) from a user's perspective. On the other hand, if the server detects a fingerprint match for a sufficient period of time and/or determines that the matching content will continue, the server may have the media presentation device present supplemental content even when faced with such a time difference.

In any event, through these or other such processes, a network server or other entity can determine the channel that the media presentation device is rendering. And once the entity determines the channel, the entity may then take action based on the channel determination. Alternatively, the entity could signal to another entity, perhaps back to the media presentation device, to cause the other entity to take action based on the channel determination. Other examples are possible as well.

In line with the discussion above, the server 20 or other entity that has access to reference data as noted above could be configured to identify multi-match scenarios, perhaps by detecting among the reference data various instances of reference fingerprint that match each other and that match query fingerprint data representing video content being rendered by the media presentation device.

In one implementation, for instance, the server could regularly analyze the reference data in search of multi-match scenarios, comparing instances of reference fingerprint data in the reference data with each other using any now known or later developed media fingerprint comparison process, in an effort to find instances of reference fingerprint data that match each other. Upon finding each such match of at least two instances of the reference fingerprint data, the server could then flag the instances of reference fingerprint data as being a multi-match group. Such a flag could indicate that there will be a potential ambiguity if the query fingerprint data representing video frames of a channel being rendered by the media presentation device matches any of the instances of reference fingerprint data in the flagged multi-match group. The server could flag the instances of reference fingerprint data as being a multi-match group in various ways. For instance, the server could cross-reference the instances of reference fingerprint data of the multi-match group in the reference data, to indicate that they are members of a multi-match group. Alternatively, the server could store a single copy of the reference fingerprint data and associate that copy with various channels on which the video frames represented by the reference fingerprint data is carried.

With this implementation, when the server receives from a media presentation device query fingerprint data representing video frames of a channel being rendered by the media presentation device and the server determines that the received query fingerprint data matches an instance of reference fingerprint data, the server could then readily determine from the reference data whether a multi-match situation exists. If the matching instance of reference fingerprint data is not flagged as being a member of a multi-match group, then the server could conclude that a single-match situation (rather than a multi-match situation) exists, in which case, as discussed above, the server could then readily determine from the reference data the channel associated with the matching instance of reference fingerprint data and could conclude that that is the channel being rendered by the media presentation device. Whereas, if the matching instance of reference fingerprint data is flagged as being a member of a multi-match group, then the server could conclude that a multi-match situation (rather than a single-match situation) exists, in which case the server may need to trigger disambiguation to facilitate identifying identify the channel at issue from among those associated with the instances of reference fingerprint data of the multi-match group.

Alternatively, in another implementation, the server could identify a multi-match group at the time the server receives query fingerprint data from the media presentation device.

For instance, when (e.g., as) the server receives the query fingerprint data from the media presentation device, the server could compare the received query fingerprint data with all instances of reference fingerprint data in the reference data. If the server thereby detects that the received query fingerprint data matches only one instance of reference fingerprint data, then the server could conclude that a single-match situation (rather than a multi-match situation) exists, in which case the server could then readily determine from the reference data the channel associated with the matching reference fingerprint data and could conclude that that is the channel being rendered by the media presentation device. Whereas, if the server detects that the received query fingerprint data matches two or more instances of reference fingerprint data, then the server could conclude that a multi-match situation (rather than a single-match situation) exists, in which case the server may need to trigger disambiguation to facilitate identifying the channel at issue from among those associated with the reference fingerprints of the multi-match group.

In line with the discussion above, the process of detecting a multi-match situation involving two or more instances of reference fingerprint data could be performed even if the two instances of reference fingerprint data represent the same media content carried on two different channels at a time delay relative to one another, i.e., where the presentation of the represented video frames on one of the channels is time shifted in relation to presentation of matching video frames on another one of the channels. The fingerprint matching process could account for this time shifting and could still find a match if the instances of fingerprint data otherwise match each other, such as by comparing one instance of fingerprint data over a sliding window with the other instance of fingerprint data. For instance, the process of finding matching reference fingerprint data within the reference data could involve searching for instances of reference fingerprint data that match one another and represent video frames presented and/or scheduled at respective times that are within a threshold time interval of each other.

As noted above, when the server or other entity carrying out this analysis detects that the query fingerprint data representing video frames of the channel being rendered by the media presentation device matches multiple instances of reference fingerprint data representing video frames of multiple channels, the entity could trigger a disambiguation process to help determine which of the channels associated with the multi-match group is the channel being rendered by the media presentation device.

In accordance with the present disclosure, the disambiguation process will be based on an evaluation of channel-specific icons that would be present in the video frames of various channels.

Figure 3:
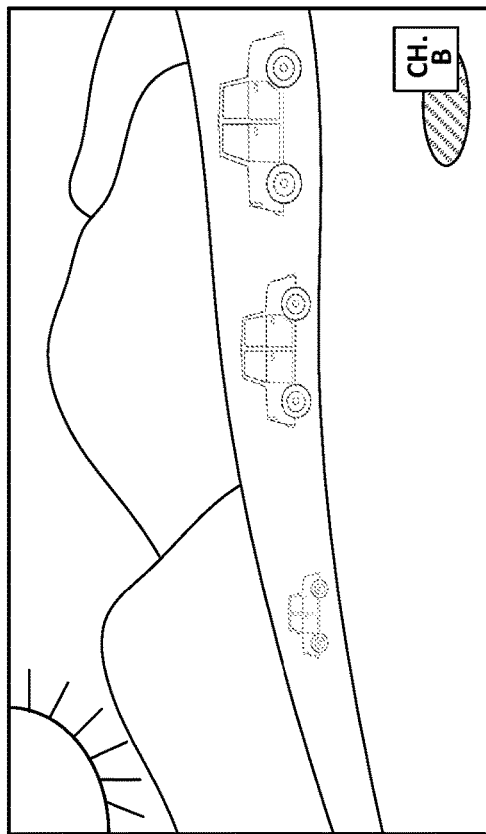
FIG. 3 is an example illustration of video frames of channels presenting the same content as each other, with the video frames including different channel-specific icons than each other.
Figure 3:
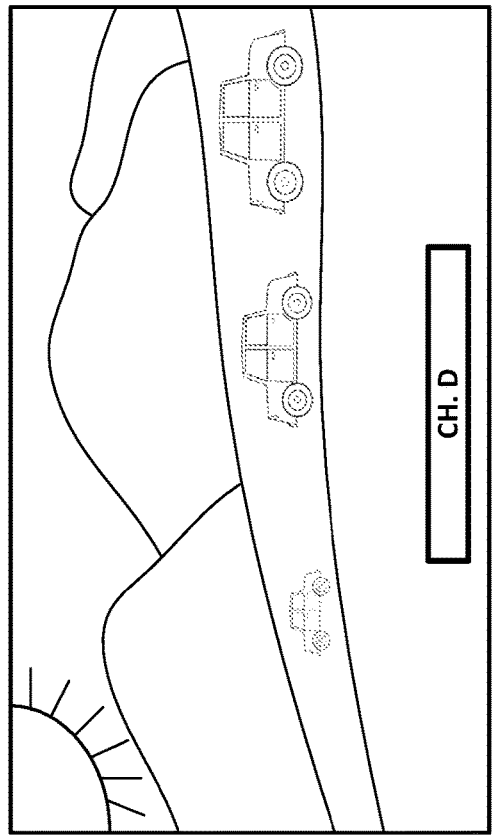
Figure 3:
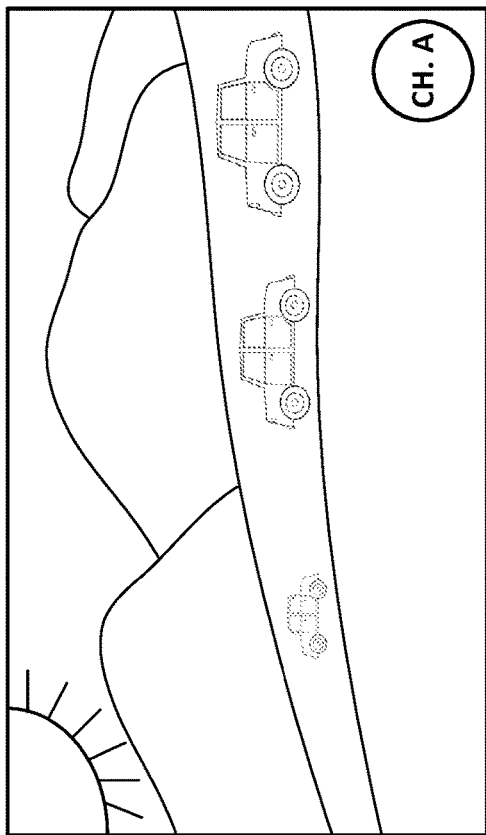
Figure 3:
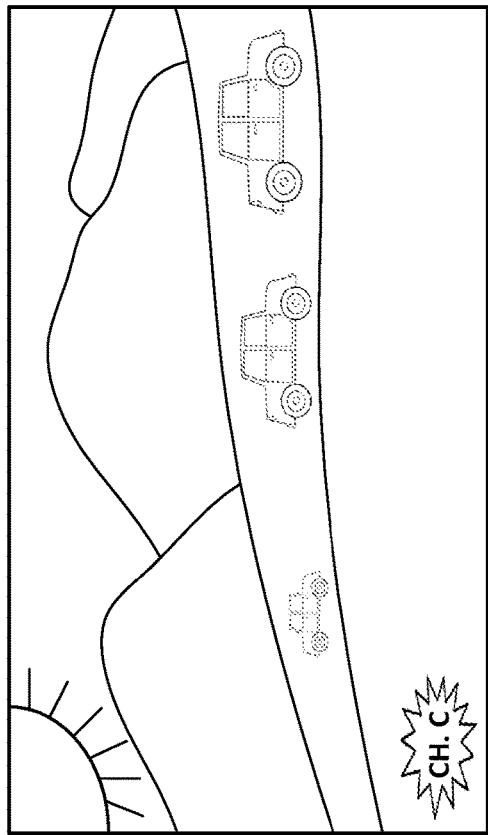

Considering channels that are presenting the same program content as each other, each channel could further present a channel-specific icon (e.g., channel number, name, or logo) at a lower corner or other position in each of its video frames or in certain of its video frames (e.g., from time to time), with each channel's icon being different than each other channel's icon and possibly being a different in-frame location that the icons of each other channels. FIG. 3 depicts an example of this situation. Namely, FIG. 3 depicts time-synchronized video frames of four channels all presenting the same video content as each other but each having a respective channel-specific icon. As shown in this example, without limitation, the channels' icons could differ from each other in shape, content, size, and/or in-frame location. Further, the channels' icons could differ from each other in other ways as well, such as in color, in the extent to which the icons contain text, graphics, points of interest, etc., in the opacity of the icons, the brightness of the icons, and/or in other aspects.

Applying a grid-based fingerprinting process or the like as discussed above to these video frames as a whole, the digital fingerprints that represent video frames of these channels could generally match each other (e.g., within an allowed tolerance), as the channel-specific icons of the channels may be just minor contributors to the overall digital fingerprint representation of each frame. Therefore, even though video frames of the various channels are not wholly identical to each other, a server may find that their digital fingerprints match each other. As a result, when given query fingerprint data representing a channel being rendered by a media presentation device, the server may find that that query fingerprint data matches reference fingerprint data of multiple channels even though those multiple channels present different channel-specific icons than each other.

Per the present disclosure as noted above, in response to facing a multi-match situation where the query fingerprint data representing video frames of the channel being rendered by the media presentation device matches reference fingerprint data respectively of multiple known channels, the server will configure the media presentation device with a set of channel-icon fingerprint data to enable and cause the media presentation device to determine which of the matching channels is the one being rendered. For instance, the server could transmit this channel-icon fingerprint data to the media presentation device. Alternatively, the server could work with the media presentation device to enable the media presentation device to obtain this data from local storage or from another server. For instance, the server could provide the media presentation device with a list of the channels deemed to be in the multi-match group, to enable the media presentation device to obtain from local storage of the media presentation device or from another server the channel-icon fingerprint data specifically for the listed channels. Other mechanisms for configuring the media presentation device with the set of channel-icon fingerprint data for the various matching channels could be possible as well.

The channel-icon fingerprint data that the server configures the media presentation device with could include, for each channel in the multi-match group, an identification of the channel as well as a digital reference fingerprint of the channel icon specific to that channel, i.e. the channel-specific icon that the channel presents.

To facilitate fingerprint matching more specifically focused on the channel icon, the reference channel-icon fingerprint per channel would optimally be a fingerprint of the channel icon rather than a fingerprint of a video frame as a whole that may happen to include the channel icon. This channel-icon fingerprint respectively for each such channel could be predefined, possibly supplied by a provider or distributor of the channel, and could be generated using a suitable fingerprint-generation technique to represent characteristics of the channel's icon. Further, as each channel may present its own icon superimposed on indeterminate background video content, the reference fingerprint of the channel's icon could be generated based on image content of just the channel icon without any background (e.g., with a transparent background) or could perhaps be generated based on image content of the channel icon together with some nearby surrounding background that is an average of likely backgrounds, among other possibilities.

The channel-icon fingerprint data that the server configures the media presentation device with could also include other useful information per channel, to help enable the media presentation device to perform icon-specific fingerprint matching in an effort to determine which of the multiple matching channels the media presentation device is rendering.

For instance, the channel-icon fingerprint data could include respectively for each channel an indication of the in-frame location where the channel's icon would be presented. This indication could take the form of a set of Cartesian coordinates in a coordinate system defined within a representative video frame, defining an in-frame region where the channel's icon would be presented. Referring to FIG. 3, for instance, for Channel A, the in-frame region could be defined by coordinates representing the area in the lower right corner of the frame where the channel's icon is presented. Whereas, for Channel C, the in-frame region could be defined by coordinates representing the area in the lower left corner of the frame where the channel's icon is presented.

This in-frame region where a channel's icon would be presented could be defined as a region having a shape that matches the outer boundary/border of the channel's icon so as to focus the analysis specifically on the channel icon itself. Further, to account of the possibility that a channel's icon may be shifted slightly from where it is normally presented, the in-frame region could be defined as a having a shape that is a bit larger than the channel icon itself, to allow for some tolerance in the analysis. In practice, this in-frame region data could be established manually in advance or could be established through computer-vision techniques, including edge detection and expansion, among other possibilities.

The in-frame region could alternatively be defined by exclusion, with a mask defining which pixels in a frame are not part of the in-frame region. To facilitate this, the channel-icon fingerprint data could define the in-frame region by defining a graphical mask that indicates what pixels in a video frame are not at or around the channel icon. This mask could likewise be defined by a set of Cartesian coordinates in the coordinate system of a video frame, indicating what pixels to mask out and thus defining the relevant in-frame region by exclusion.

Still further, the in-frame region or mask could be defined by in-frame coordinates and reference to one or more predefined graphical shapes. For instance, the media presentation device could be pre-provisioned with data defining various graphical shapes such as a circle, a rectangle, and a triangle, among other possibilities. To simplify the process of the server informing the media presentation device what in-frame region contains a given channel's icon, the server could then include in the channel-icon fingerprint data a specification of one or more such shapes that define the region, the size or dimensions of each such shape, and an in-frame position of each such shape. The media presentation device could then readily deem the in-frame region or the non-masked-out region to be where the indicate shape(s) of the indicated size(s) and position(s) are.

For instance, as to Channel A as shown in FIG. 3, since the channel-icon is generally circular, the server could include in the channel-icon fingerprint data an index value that the media presentation device would interpret to mean a circle shape, along with a specification of the circle's center point location and radius length in the frame coordinate system, to closely approximate the shape and size of the Channel-A icon. And as to Channel-B, since the channel-icon is a composite of an ellipse and a rectangle, the server could include in the channel-icon fingerprint data such index, dimension, and location information respectively for both the ellipse and rectangle, which could cooperatively approximate the composite shape, size, and location of the Channel-B icon.

Provided with this or other such in-frame-region location information respectively for each of the channels in the multi-match group and provided with the reference channel-icon fingerprint respectively for each such channel, the media presentation device could generate a query channel-icon fingerprint respectively for each channel in the multi-match group, to facilitate fingerprint comparison to determine which of the multi-match channels the media presentation device is rendering. For each such channel, for instance, the media presentation device could generate, respectively for each of one or more video frames of the channel that the media presentation device is rendering, a query fingerprint representing the pixels in that channel's respective in-frame region (contrasted with generating a query fingerprint of the video frame as a whole), to facilitate comparison of that query fingerprint with the channel's reference channel-icon fingerprint.

For each channel in the multi-match group, the media presentation device's generation of a query channel-icon fingerprint as to that channel's respective in-frame region in the channel being rendered by the media presentation device could use the same fingerprinting process that was used to generate the reference channel-icon fingerprint of the channel's icon.

Further, for a given such channel in the multi-match group, the media presentation device may apply a specific fingerprint-generation technique that is selected based on one or more characteristics of the channel's icon. For instance, some channels may have icons that are slightly animated, in which case it may be best for the media presentation device to generate query fingerprints of the respective in-frame region over the course of multiple frames of the channel being rendered and to average those query fingerprints together in an effort to establish a composite query fingerprint representation of the in-frame region. Whereas, other channels may have more static icons, in which case it may suffice for the media presentation device to generate the query channel-icon fingerprint of the in-frame region in just a single frame of the channel being rendered. Similar or other variations in fingerprint-generation technique could apply based on whether a channel's icon has clear edges, hard features, and/or other points of interest, or not.

To facilitate having the media presentation device apply one query-fingerprint-generation technique or another based on one or more such characteristics of a channel's icon, the channel-icon fingerprint data that the server configures the media presentation device with could also indicate respectively per channel what query-fingerprint-generation technique the media presentation device should apply. In practice, for instance, the server could determine one or more such characteristics of a channel's icon and could then refer to predefined mapping data that correlates each of various such characteristics or characteristic combinations with a fingerprint-generation technique deemed suitable given the characteristic(s), to determine (e.g., select) a suitable query-fingerprint-generation technique for a given channel. Or the server could more directly determine or select a query-fingerprint-generation technique that would be suitable for a given channel given one or more characteristics of the channel's icon. The server could then indicate this fingerprint-generation technique in the channel-icon fingerprint data expressly or perhaps by referring to a fingerprintgeneration-technique index value that the media presentation device would correlate with the associated technique. And the media presentation device could thereby learn the technique to apply and proceed accordingly.

In an example implementation, the reference data 24 accessible to the server could include various information to enable the server to compile and provide the appropriate reference channel-icon fingerprint data to the media presentation device upon detecting a multi-match situation. For instance, the reference data 24 could include respectively for each of various channels the reference channel-icon fingerprint representing specifically that channel's icon. Further, the reference data 24 could include respectively for each such channel a definition of the in-frame region where the channel's icon would be presented (e.g., positively defining coordinates, shapes, and sizes of the in-frame region, or likewise defining the in-frame region by exclusion with mask data). Further, the reference data 24 could include respectively for each of various channels an indication of one or more other characteristics of the channel's icon, to enable selection of a suitable query-fingerprint-generation technique per channel, and/or the reference data 24 could include respectively for each of various channels a query-fingerprint-generation technique suitable for the channel's icon.

When the server detects a multi-match situation in which the reference fingerprint data representing video frames of multiple different channels match the query fingerprint data representing the video frames of the channel being rendered by the media presentation device, the server could responsively refer to the reference data 24 to obtain and compile the reference channel-icon fingerprint data for those multiple channels. And the server could send that compiled reference channel-icon fingerprint data to the media presentation device in a control message to which the media presentation device could respond as noted above to enable the media presentation device to proceed with the channel-icon-focused fingerprint analysis.

For each channel in the multi-match group, once the media presentation device generates the query channel-icon fingerprint for that channel, the media presentation device could then compare the generated query channel-icon fingerprint with the provided reference channel-icon fingerprint for that channel, using a suitable fingerprint comparison technique as like that described above for instance. And the media presentation device could determine based on that comparison if the query channel-icon fingerprint data matches the reference channel-icon fingerprint data.

On finding such a match with a sufficient level of confidence, the media presentation device could thereby conclude that the channel that the media presentation device is rendering is the channel corresponding with the matching reference channel-icon fingerprint. Conversely, on finding that there is no such match as to one or more of the multi-match channels, the media presentation device could conclude that each such channel is not the channel that the media presentation device is rendering. Further, the media presentation device could conduct this channel-icon-focused fingerprint comparison one reference channel at a time and, upon finding a match as to a given such channel could forgo further comparison as to any remaining channels in the multi-match group.

Once the media presentation device has thereby determined which of the multi-match channels the media presentation device is rendering, the media presentation device could report an indication of that determined channel to the server or another entity, to enable the server or other entity to take associated channel-specific action. For instance, if the channel-icon fingerprint data included an identification of each multi-match channel, the media presentation device could report that identification of the determined channel. And as noted above, the channel-specific action that could be taken in response to this channel identification could include recording ratings data and/or enabling dynamic ad insertion, among other possibilities.

Figure 4:
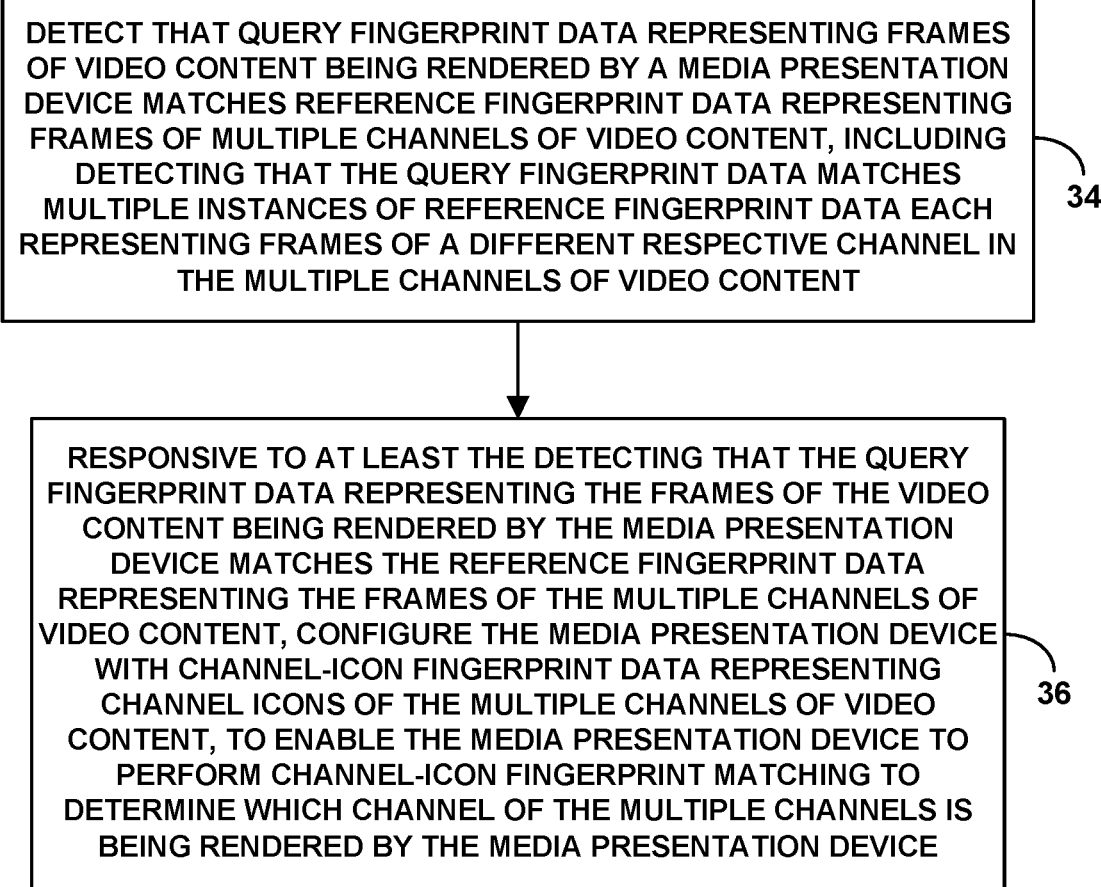
FIG. 4 is a flow chart depicting operations that can be carried out in accordance with the present disclosure.

FIG. 4 is a flow chart depicting a method that could be carried out in line with the discussion above. As shown in FIG. 4, at block 34, the method involves the computing system detecting that query fingerprint data representing frames of video content being rendered by a media presentation device matches reference fingerprint data representing frames of multiple channels of video content, including detecting that the query fingerprint data matches multiple instances of reference fingerprint data each representing frames of a different respective channel in the multiple channels of video content. Further, at block 36, the method includes, responsive to at least the detecting that the query fingerprint data representing the frames of the video content being rendered by the media presentation device matches the reference fingerprint data representing the frames of the multiple channels of video content, configuring the media presentation device with channel-icon fingerprint data representing channel icons of the multiple channels of video content, to enable the media presentation device to perform channel-icon fingerprint matching to determine which channel of the multiple channels is being rendered by the media presentation device.

In line with the discussion above, the act of configuring the media presentation device with the channel-icon fingerprint data could involve transmitting the channel-icon fingerprint data in a control message to the media presentation device, to cause the media presentation device to perform the channel-icon fingerprint matching to determine which channel of the multiple channels is being rendered by the media presentation device.

As discussed above, this channel-icon fingerprint data could include, respectively for each channel in the multiple channels of video content, a reference channel-icon fingerprint representing a channel icon specific to the channel. And each channel in the multiple channels of video content may present in a respective in-frame region the channel icon specific to the channel, in which case the channel-icon fingerprint data could additionally include, respectively for each channel in the multiple channels of video content, coordinates defining the in-frame region at which the channel presents the channel icon specific to the channel.

Further, as discussed above, the act of configuring the media presentation device with the channel-icon fingerprint data could enable the media presentation device to generate query channel-icon fingerprints representing the in-frame regions at which the channels in the multiple channels of video content present their respective channel icons and to compare the generated query channel-icon fingerprints with the reference channel-icon fingerprints representing the channel icons specific to the multiple channels of video content, so as to determine which channel of the multiple channels is being rendered by the media presentation device.

In addition, as discussed above, the channel icon respectively of each channel in the multiple channels of video content could have a respective channel-icon characteristic, such as a particular shape, a particular level of transparency, and/or a particular dynamic/animated nature, among other possibilities. And as discussed above, the method could additionally include, for at least one channel in the multiple channels of video content (i) determining a fingerprint-generation technique suitable for the channel's respective channel-icon characteristic and (ii) including in the channel-icon fingerprint data an indication of the determined fingerprint-generation technique, to enable the media presentation device to apply the selected fingerprint-generation technique for generating the query channel-icon fingerprint representing the in-frame region at which the channel presents the channel's respective channel icon.

Further, as discussed above, the method could additionally include, after configuring the media presentation device with the channel-icon fingerprint data, receiving from the media presentation device a report of the channel that the media presentation device determined based on the channel-icon fingerprint data. And the method could include taking action based on the determining of which channel of the multiple channels is being rendered by the media presentation device. As noted above, example actions could include causing supplemental channel-specific content to be presented by the media presentation device in conjunction with the media content being rendered by the media presentation device, causing the media presentation device to engage in dynamic ad insertion on the channel being rendered by the media presentation device, and/or recording presentation of the determined channel for use in a channel ratings system.

Various other features described herein could be applied in this context as well, and vice versa.

Figure 5:
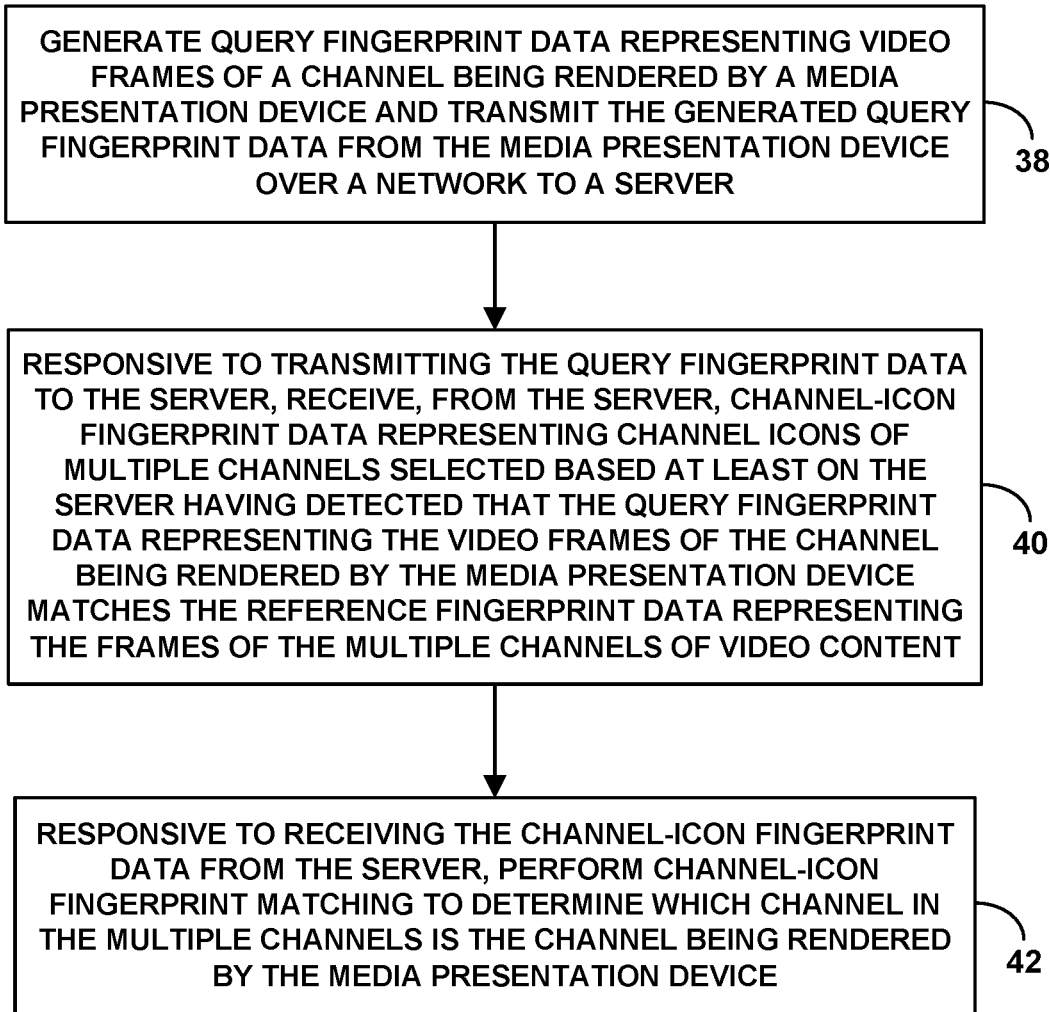
FIG. 5 is another flow chart depicting operations that can be carried out in accordance with the present disclosure.

FIG. 5 is next another flow chart depicting a method that could be carried out in line with the discussion above. As shown in FIG. 5, at block 38, the method involves a media presentation device generating query fingerprint data representing video frames of a channel being rendered by the media presentation device and transmitting the generated query fingerprint data from the media presentation device over a network to a server. Further, at block 40, the method involves, responsive to transmitting the query fingerprint data to the server, the media presentation device receiving, from the server, channel-icon fingerprint data representing channel icons of multiple channels selected based at least on the server having detected that the query fingerprint data representing the video frames of the channel being rendered by the media presentation device matches the reference fingerprint data representing the frames of the multiple channels of video content. And at block 42, the method involves, responsive to receiving the channel-icon fingerprint data from the server, the media presentation device performing channel-icon fingerprint matching to determine which channel in the multiple channels is the channel being rendered by the media presentation device.

In line with the discussion above, the channel-icon fingerprint data here as well could include, respectively for each channel in the multiple channels of video content, a reference channel-icon fingerprint representing a channel icon specific to the channel. And each channel in the multiple channels of video content may present in a respective in-frame region the channel icon specific to the channel, in which case the channel-icon fingerprint data could additionally include, respectively for each channel in the multiple channels of video content, coordinates defining the in-frame region at which the channel presents the channel icon specific to the channel.

Further, as discussed above, the act of the media presentation device performing channel-icon fingerprint matching to determine which channel in the multiple channels is the channel being rendered by the media presentation device could involve (i) the generating query channel-icon fingerprints representing the in-frame regions at which the channels in the multiple channels of video content present their respective channel icons and (ii) comparing the generated query channel-icon fingerprints with the reference channel-icon fingerprints representing the channel icons specific to the multiple channels of video content, so as to determine which channel of the multiple channels is being rendered by the media presentation device.

Yet further, here too as discussed above, the channel icon respectively of each channel in the multiple channels of video content could have a respective channel-icon characteristic, such as a particular shape, a particular level of transparency, and/or a particular dynamic/animated nature, among other possibilities. And as discussed above, the method could additionally include, for at least one channel in the multiple channels of video content (i) the media presentation device receiving, in the channel-icon fingerprint data an indication of a fingerprint-generation technique determined by the server to be suitable for the channel's respective channel-icon characteristic and (ii) the media presentation device applying the indicated fingerprint-generation technique for generating the query channel-icon fingerprint representing the in-frame region at which the channel presents the channel's respective channel icon.

And still further, as discussed above, the method could additionally include, after determining based on the channel-icon fingerprint matching which channel in the multiple channels is the channel being rendered by the media presentation device, transmitting from the media presentation device to the server a report of the determined channel.

Various other features described herein could be applied in this context too, and vice versa.

Figure 6:
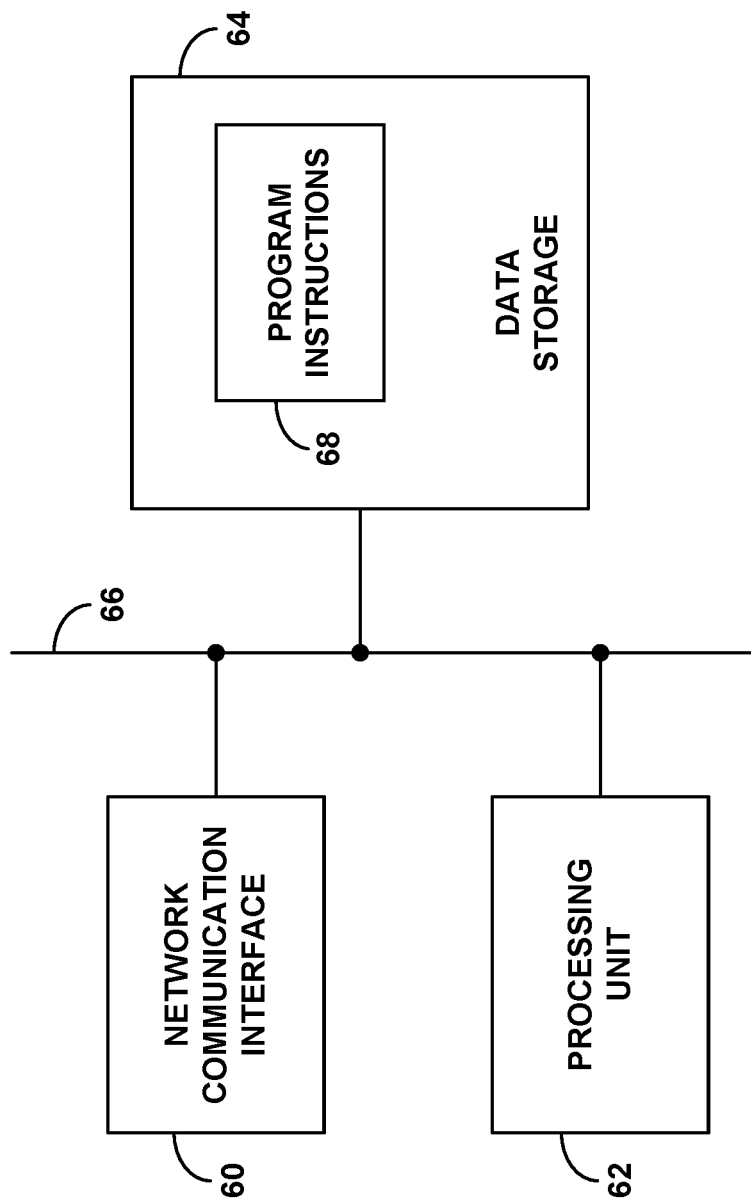
FIG. 6 is a simplified block diagram of an example network server.

FIG. 6 is next a simplified block diagram of an example system operable in accordance with the present disclosure. This system could represent a network server as described above, and/or one or more other entities (possibly including the media presentation device). As shown in FIG. 6, the example system includes a network communication interface 60, a processing unit 62, non-transitory data storage 64, any or all of which could be integrated together or, as shown, communicatively linked together by a system bus, network, or other connection mechanism 66.

Network communication interface 60 could comprise one or more physical network connection mechanisms to facilitate communication on a network such as network 22 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 62, could then comprise one or more general purpose processors (e.g., microprocessors) and/or one or more specialized processors (e.g., application specific integrated circuits). And non-transitory data storage 64 could comprise one or more volatile and/or non-volatile storage components, such as optical, magnetic, or flash storage.

As shown, data storage 64 then stores program instructions 68, which could be executable by processing unit 62 to carry out various operations described herein.

FIG. 7 is next a simplified block diagram of an example media presentation device operable in accordance with the present disclosure. In line with the discussion above, this media presentation device could take various forms. For instance, it could be a television, computer monitor, projector, or other device that operates to receive and render video content. Numerous other examples are possible as well.

As shown in FIG. 7, the example media presentation device includes a media input interface 70, a media presentation interface 72, a network communication interface 74, a processing unit 76, and non-transitory data storage 78, any or all of which could be integrated together or, as shown, communicatively linked together by a system bus, network, or other connection mechanism 80.

Media input interface 70 could comprise a physical communication interface for receiving media content to be presented by the media presentation device. As such, the media input interface could include one or more wired and/or wireless interfaces for establishing communication with and receiving media content in analog or digital form from a receiver or other device or system. For example, the media input interface could include one or more interfaces compliant with protocols such as DVI, HDMI, VGA, USB, BLUETOOTH, WIFI, among numerous others.

Media presentation interface 72 could then comprise one or more components to facilitate presentation of the received media content. By way of example, the media presentation interface could comprise a user interface such as a display screen and/or a loudspeaker, as well as one or more drivers or other components for processing the received media content to facilitate presentation of the content on the user interface.

Network communication interface 74 could comprise a physical network connection mechanism to facilitate communication on a network such as network 22 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 76 could then comprise one or more general purpose processors (e.g., microprocessors) and/or one or more specialized processors (e.g., application specific integrated circuits). And non-transitory data storage 78 could comprise one or more volatile and/or non-volatile storage components, such as optical, magnetic, or flash storage. Further, as shown, data storage 78 stores program instructions 82, which could be executable by processing unit 76 to carry out various operations described here. For example, the program instructions could be executable to generate on an ongoing basis a fingerprint of media content being rendered by the media presentation device, based on analysis of the media content being received at the media input interface 70 and/or being processed at the media presentation interface 72, and to provide the generated fingerprint on an ongoing basis to facilitate channel identification as described herein.

Exemplary embodiments have been described above. Those skilled in the art will understand, however, that changes and modifications may be made to these embodiments without departing from the true scope and spirit of the invention.

What is claimed is:

1. A method comprising:
    detecting, by a computing system, that a query fingerprint matches multiple instances of reference fingerprints each representing frames of a respective channel in multiple channels of video content being rendered by a media presentation device; and
    responsive to at least the detecting that the query fingerprint matches the reference fingerprints, configuring the media presentation device with channel-icon fingerprint data, wherein the channel-icon fingerprint data includes multiple reference channel-icon fingerprints each representing a channel icon of a respective channel in the multiple channels, and multiple indications each representing an in-frame region of a respective channel in the multiple channels at which the respective channel presents the channel icon specific to the respective channel, to enable the media presentation device to perform channel-icon fingerprint matching to determine which channel of the multiple channels is being rendered by the media presentation device.

2. The method of claim 1, wherein configuring the media presentation device with the channel-icon fingerprint data comprises transmitting the channel-icon fingerprint data in a control message to the media presentation device to cause the media presentation device to perform the channel-icon fingerprint matching to determine which channel of the multiple channels is being rendered by the media presentation device.

3. The method of claim 1, wherein each indication of the multiple indications specifies coordinates defining the respective in-frame region.

4. The method of claim 1, further comprising, after configuring the media presentation device with the channel-icon fingerprint data, receiving, from the media presentation device, a report of the channel that the media presentation device determined based on the channel-icon fingerprint data.

5. The method of claim 1, wherein each reference channel-icon fingerprint of the reference channel icon-fingerprints is different from each of the reference fingerprints.

6. The method of claim 1, wherein each reference channel-icon fingerprint of the reference channel-icon fingerprints is generated based on image content of the respective channel icon without any background.

7. The method of claim 3, wherein configuring the media presentation device with the channel-icon fingerprint data enables the media presentation device to generate query channel-icon fingerprints representing the in-frame regions at which the channels in the multiple channels of video content present their respective channel icons and to compare the generated query channel-icon fingerprints with the reference channel-icon fingerprints, so as to determine which channel of the multiple channels is being rendered by the media presentation device.

8. The method of claim 7, wherein the channel icon, respectively of each channel in the multiple channels of video content, has a respective channel-icon characteristic, the method further comprising, for at least one channel in the multiple channels of video content:
    determining a fingerprint-generation technique suitable for the respective channel-icon characteristic of the channel; and
    including in the channel-icon fingerprint data an indication of the determined fingerprint-generation technique to enable the media presentation device to apply the determined fingerprint-generation technique for generating the query channel-icon fingerprint representing the in-frame region at which the channel presents the respective channel icon of the channel.

9. The method of claim 4, further comprising taking action based on the determining of which channel of the multiple channels is being rendered by the media presentation device.

10. The method of claim 9, wherein taking the action comprises causing supplemental channel-specific content to be presented by the media presentation device in conjunction with the video content being rendered by the media presentation device.

11. The method of claim 9, wherein taking the action comprises causing the media presentation device to engage in dynamic ad insertion on the channel being rendered by the media presentation device.

12. The method of claim 9, wherein taking the action comprises recording presentation of the determined channel for use in a channel ratings system.

13. A system comprising:
a network communication interface;
a processing unit;
non-transitory data storage; and
program instructions stored in the non-transitory data storage and executable by the processing unit to carry out operations including:
detecting that a query fingerprint matches multiple instances of reference fingerprints each representing frames of a respective channel in multiple channels of video content being rendered by a media presentation device, and
responsive to at least the detecting that the query fingerprint matches the reference fingerprints, configuring the media presentation device with channel-icon fingerprint data, wherein the channel-icon fingerprint data includes multiple reference channel-icon fingerprints each representing a channel icon of a respective channel in the multiple channels, and multiple indications each representing an in-frame region of a respective channel in the multiple channels at which the respective channel presents the channel icon specific to the respective channel, to enable the media presentation device to perform channel-icon fingerprint matching to determine which channel of the multiple channels is being rendered by the media presentation device.

14. The system of claim 13, wherein configuring the media presentation device with the channel-icon fingerprint data comprises transmitting the channel-icon fingerprint data in a control message to the media presentation device to cause the media presentation device to perform the channel-icon fingerprint matching to determine which channel of the multiple channels is being rendered by the media presentation device.

15. The system of claim 13, wherein each indication of the multiple indications specifies coordinates defining the respective in-frame region.

16. The system of claim 15, wherein configuring the media presentation device with the channel-icon fingerprint data enables the media presentation device to generate query channel-icon fingerprints representing the in-frame regions at which the channels in the multiple channels of video content present their respective channel icons and to compare the generated query channel-icon fingerprints with the reference channel-icon fingerprints, so as to determine which channel of the multiple channels is being rendered by the media presentation device.

17. The system of claim 16, wherein the channel icon, respectively of each channel in the multiple channels of video content, has a respective channel-icon characteristic, the operations further including, for at least one channel in the multiple channels of video content:
using the respective channel-icon characteristic of the channel as a basis to select a fingerprint-generation technique; and
including, in the channel-icon fingerprint data, an indication of the selected fingerprint-generation technique to enable the media presentation device to apply the selected fingerprint-generation technique for generating the query channel-icon fingerprint representing the in-frame region at which the channel presents the respective channel icon of the channel.

18. The system of claim 17, wherein the operations further include, after configuring the media presentation device with the channel-icon fingerprint data:
receiving, from the media presentation device, a report of the channel that the media presentation device determined based on the channel-icon fingerprint data; and
taking action based on the determining of which channel of the multiple channels is being rendered by the media presentation device.

19. Non-transitory data storage having stored program instructions executable by a processing unit to carry out operations including:
detecting that a query fingerprint matches multiple instances of reference fingerprints each representing frames of a respective channel in multiple channels of video content being rendered by a media presentation device, and
responsive to at least the detecting that the query fingerprint matches the reference fingerprints, configuring the media presentation device with channel-icon fingerprint data, wherein the channel-icon fingerprint data includes multiple channel-icon fingerprints each representing a channel icon of a respective channel in the multiple channels, and multiple indications each representing an in-frame region of a respective channel in the multiple channels at which the respective channel presents the channel icon specific to the respective channel, to enable the media presentation device to perform channel-icon fingerprint matching to determine which channel of the multiple channels is being rendered by the media presentation device.

20. The non-transitory data storage of claim 19,
wherein each indication of the multiple indications specifies coordinates defining the respective in-frame region, and
wherein configuring the media presentation device with the channel-icon fingerprint data enables the media presentation device to generate query channel-icon fingerprints representing the in-frame regions at which the channels in the multiple channels of video content present their respective channel icons and to compare the generated query channel-icon fingerprints with the reference channel-icon fingerprints, so as to determine which channel of the multiple channels is being rendered by the media presentation device.

\* \* \* \* \*

UNITED STATES PATENT AND TRADEMARK OFFICE
CERTIFICATE OF CORRECTION

| | | |
|---|---|---|
| PATENT NO. | : 11,638,058 B2 | |
| APPLICATION NO. | : 17/644658 | |
| DATED | : April 25, 2023 | |
| INVENTOR(S) | : Schmidt et al. | |

It is certified that error appears in the above-identified patent and that said Letters Patent is hereby corrected as shown below:

In the Claims

In Column 24, Claim 19, Line 23, delete "Non-transitory" and insert -- A non-transitory --, therefor.

Signed and Sealed this
Fourth Day of July, 2023

Katherine Kelly Vidal
*Director of the United States Patent and Trademark Office*